Nov. 17, 1936.  A. P. BUQUOR  2,060,789
SUSPENSION AND LOAD EQUALIZING SYSTEM FOR VEHICLES
Filed Sept. 21, 1934   5 Sheets-Sheet 3
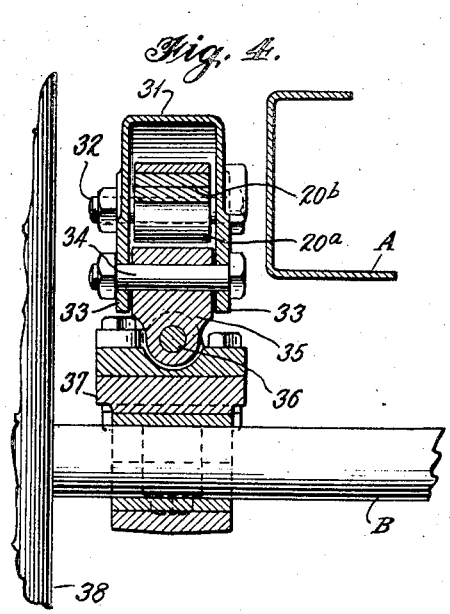
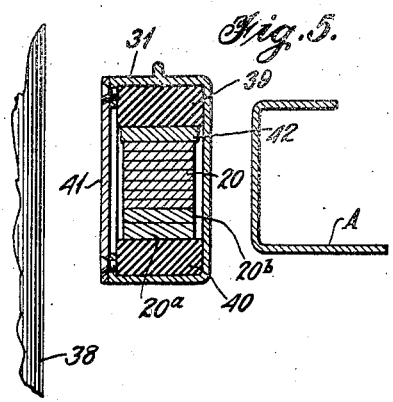
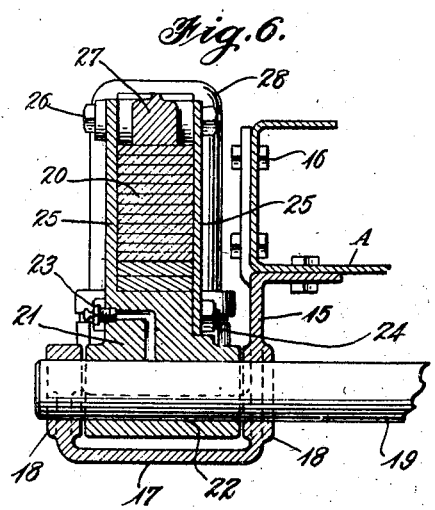
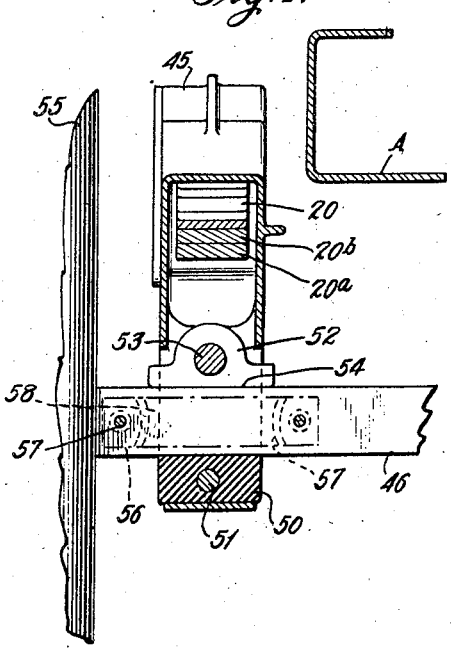
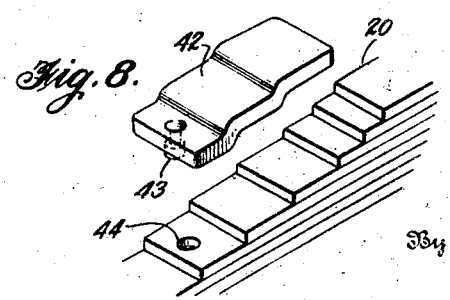
Inventor
Adolph P. Buquor
By Bacon & Thomas
Attorneys

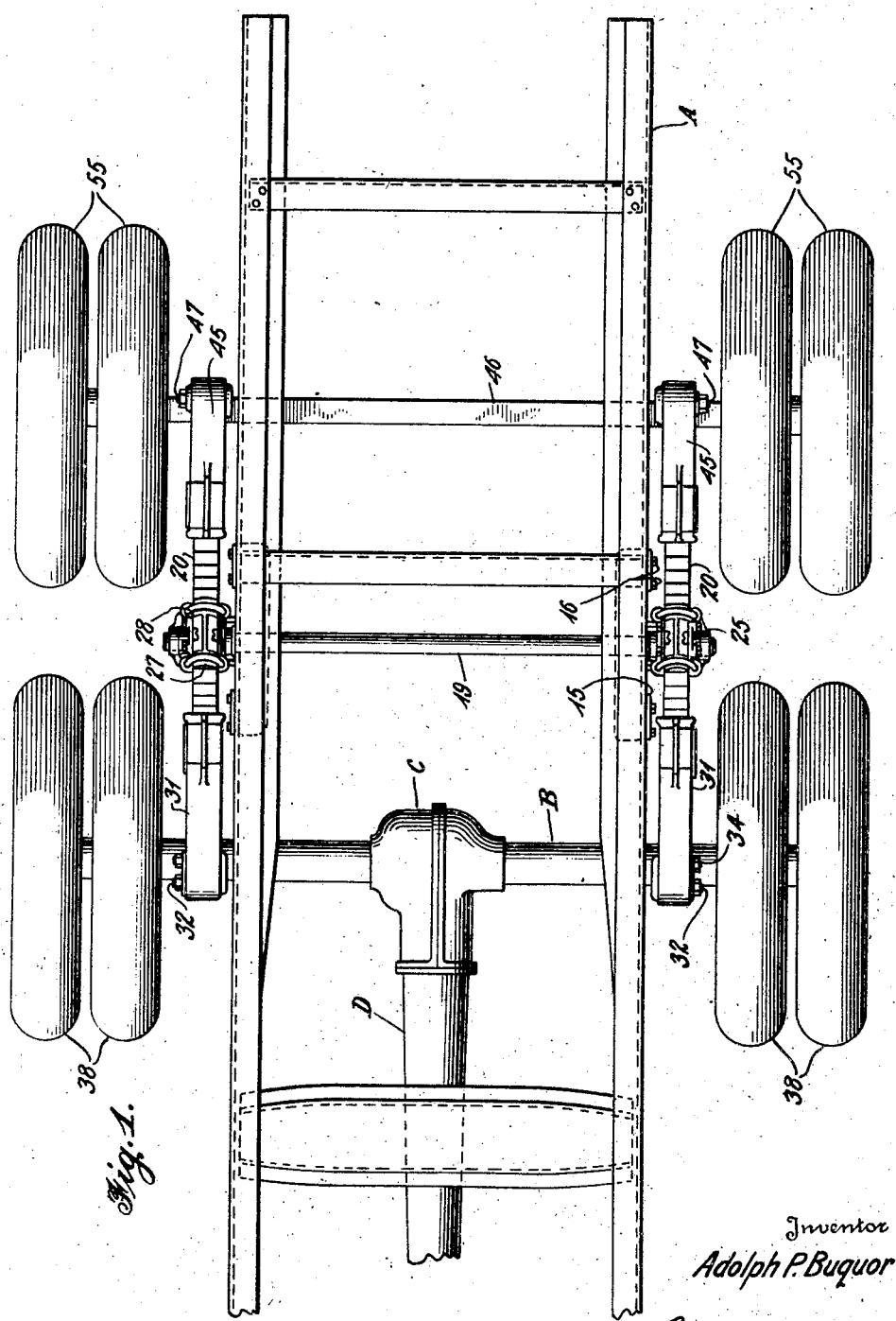

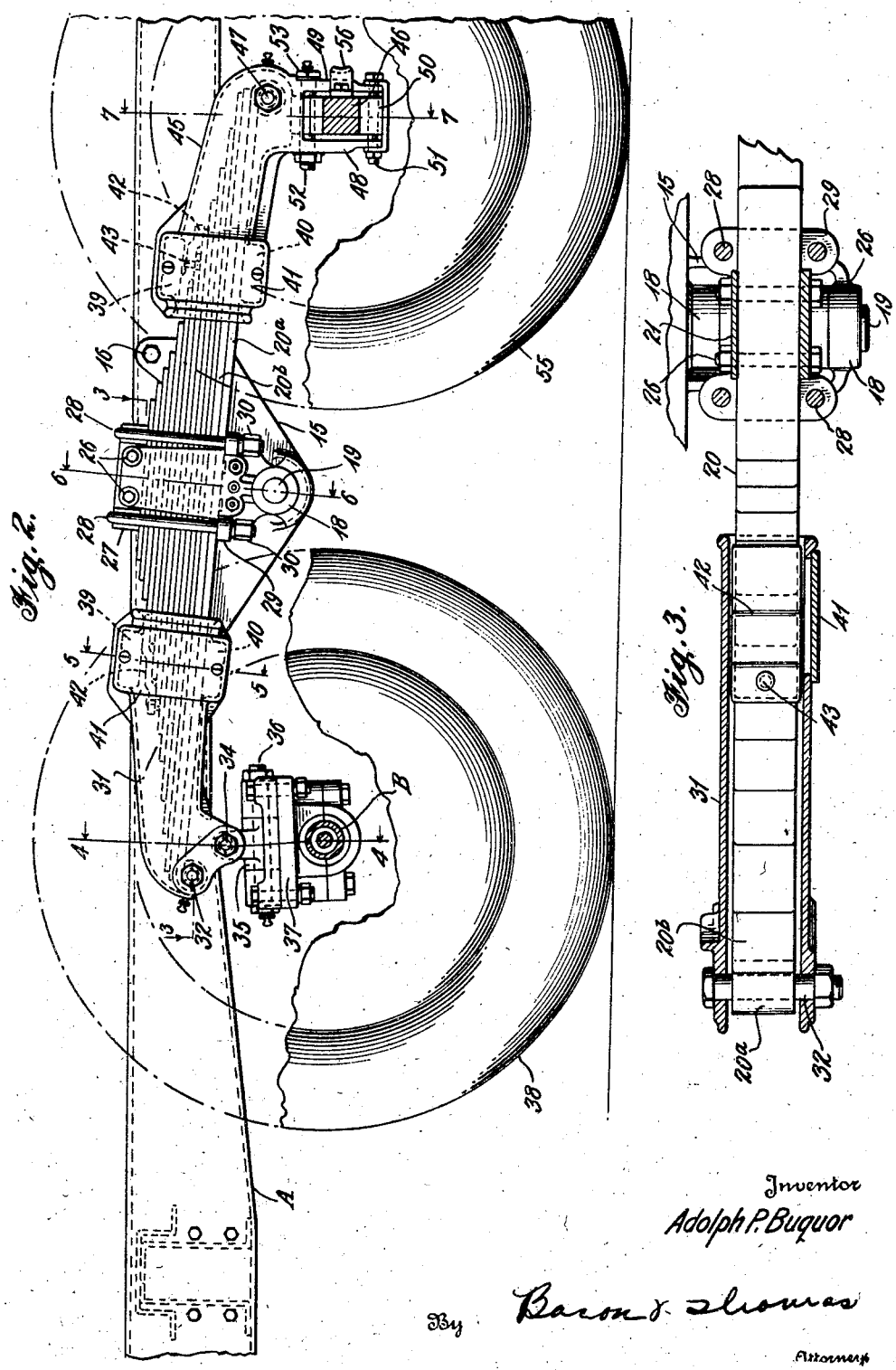

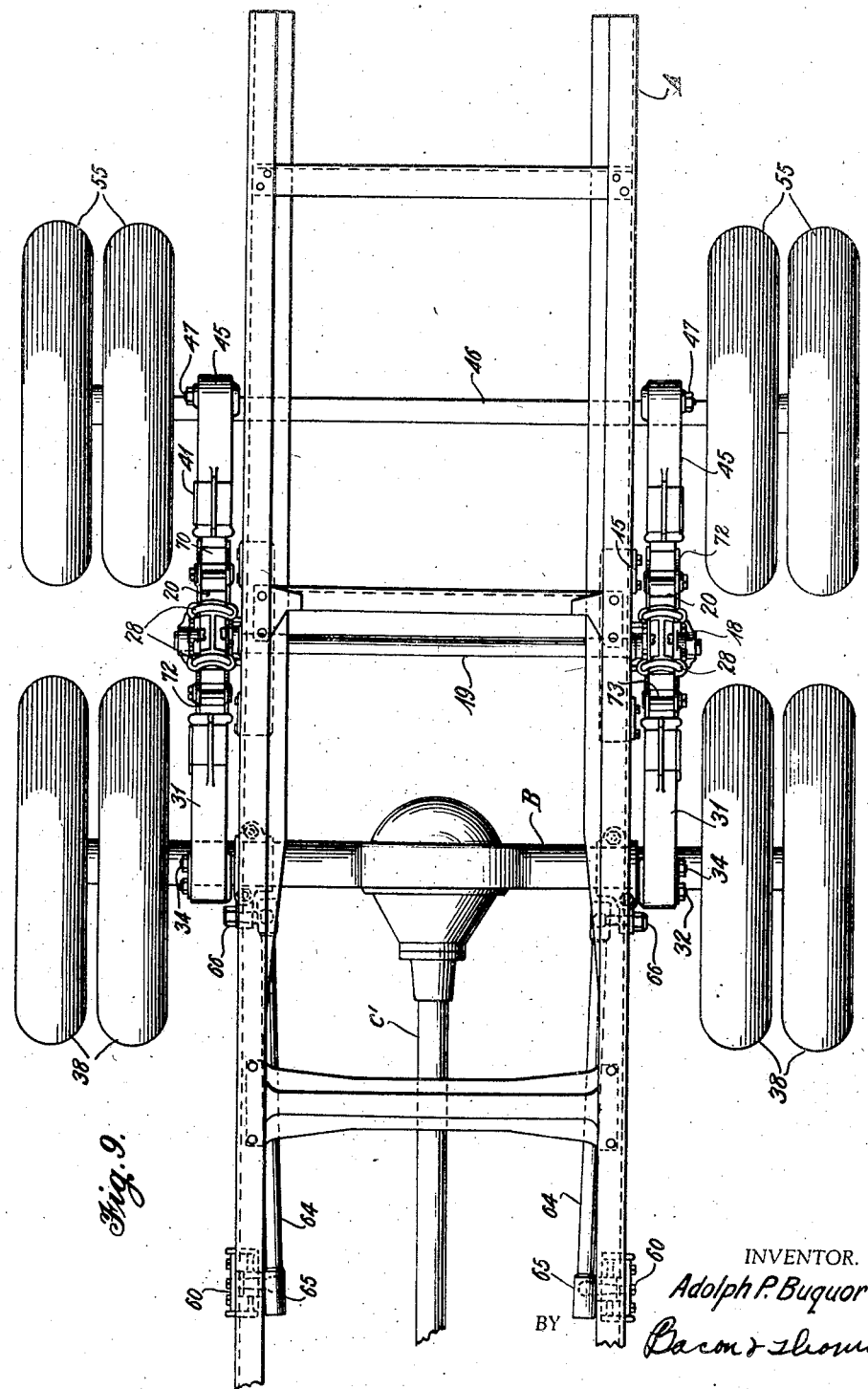

Nov. 17, 1936.                A. P. BUQUOR                 2,060,789
           SUSPENSION AND LOAD EQUALIZING SYSTEM FOR VEHICLES
                    Filed Sept. 21, 1934        5 Sheets-Sheet 5
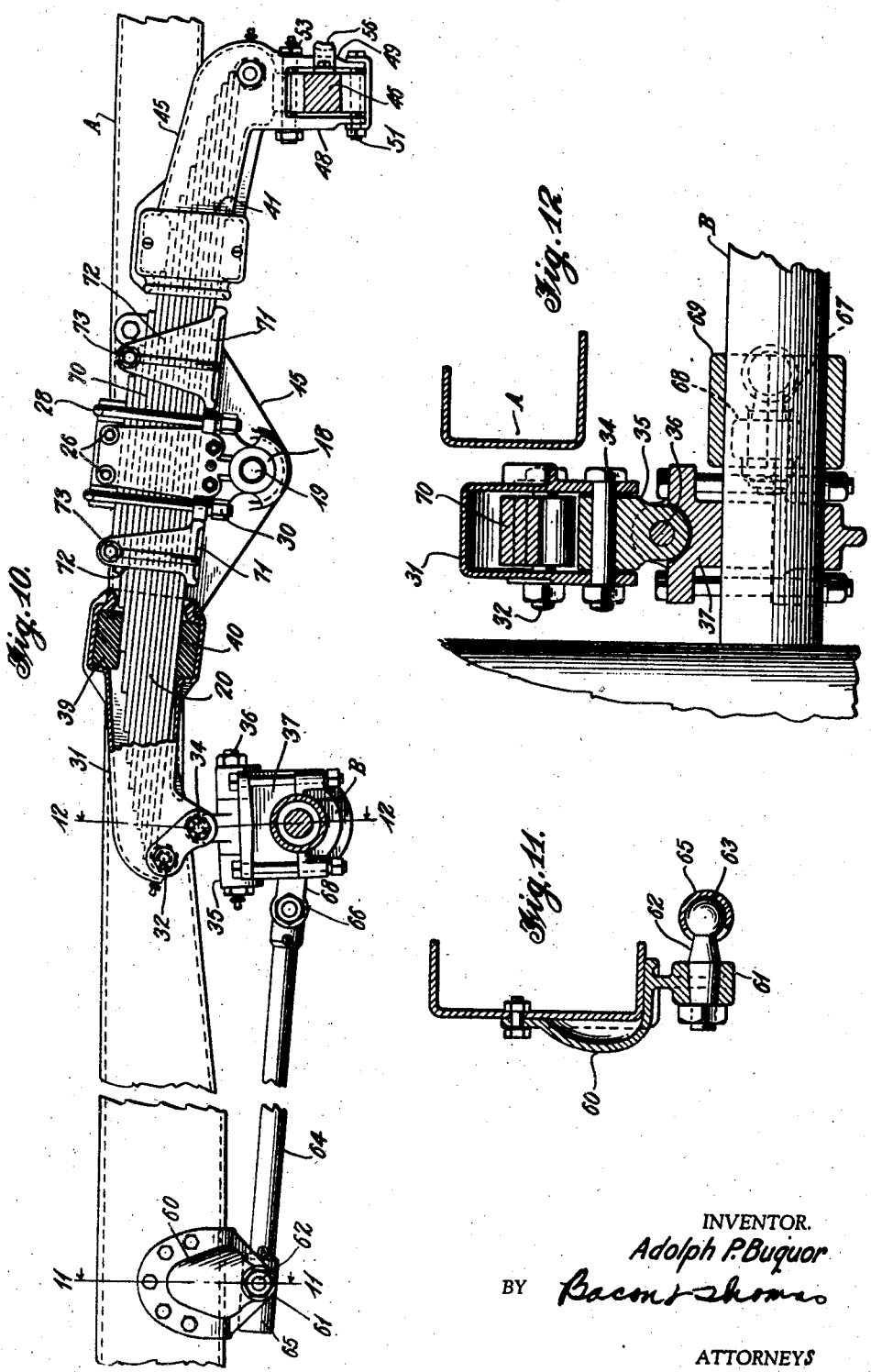
INVENTOR.
Adolph P. Buquor
BY
ATTORNEYS Patented Nov. 17, 1936

2,060,789

UNITED STATES PATENT OFFICE 2,060,789

SUSPENSION AND LOAD EQUALIZING SYSTEM FOR VEHICLES

Adolph Paschal Buquor, York, Pa., assignor, by mesne assignments, to Reconstruction Finance Corporation, Philadelphia, Pa., a corporation Application September 21, 1934, Serial No. 744,931

14 Claims. (Cl. 280—124)

This invention relates to new and useful improvements in suspension and load equalizing systems for vehicles, and constitutes an improvement over the system disclosed in my Patent No. 2,012,752, dated August 27, 1935.

The primary object of this invention is to provide a suspension and load equalizing system which is adapted for use in converting standard trucks of the four-wheel, light load type into heavy duty trucks of the ten-wheel type.

A further object of the invention is to provide a rear truck suspension and load equalizing system wherein the conventional two-wheel rear suspension system is removed and an eight-wheel suspension system substituted therefor.

A still further object of the invention is to provide a suspension and load equalizing system for the rear end of vehicles which is capable of distributing the load between the respective axles and their load carrying wheels and which will permit of relative angular and longitudinal movement between the respective axles to allow for independent rise and fall of the various sets of wheels and which will allow for proper movement of the dead or auxiliary axle during execution of a turn.

Another important object of the invention is to provide novel forms of connections between the respective ends of the springs and the associated ends of the axles to allow for desired movement of the axles relative to the vehicle frame and the springs without placing undue stresses and strains upon the suspension system.

Other objects and advantages of the invention will be apparent during the course of the following description.

In the accompanying drawings forming a part of this specification and in which like numerals are employed to designate like parts throughout the same, Figure 1 is a fragmentary top plan view of one form of suspension and load equalizing system embodying this invention, Figure 2 is a side elevational view disclosing one longitudinal spring member and its connections with the chassis of the vehicle and the respective axles, Figure 3 is a horizontal sectional view of a portion of the assembly shown in Figure 2, Figure 4 is a vertical sectional view taken on line 4—4 of Fig. 2, Figure 5 is a vertical sectional view taken on line 5—5 of Fig. 2, Figure 6 is a vertical sectional view taken on line 6—6 of Fig. 2, Figure 7 is a vertical sectional view taken on line 7—7 of Fig. 2, Figure 8 is a detailed perspective view disclosing a filler plate which is employed as a part of the connection between a spring and an end boot, Figure 9 is a similar view to Fig. 1 but disclosing a suspension and load equalizing system designed for use in connection with a different form of standard truck equipment, Figure 10 is a similar view to Fig. 2 but disclosing the system set forth in Fig. 9.

Figure 11 is a vertical sectional view taken on line 11—11 of Fig. 10, and

Figure 12 is a vertical sectional view taken on line 12—12 of Fig. 10.

In the drawings, wherein for the purpose of illustration are shown two preferred embodiments of this invention, and referring particularly to Figs. 1 to 8 inclusive, the character A designates in its entirety an extension which has been added to the rear end of a standard truck for the purpose of increasing the size and load carrying capacity of said truck. The stock equipment of this standard truck includes a rear axle designated in its entirety by the reference character B, including a differential housing C and a torque tube D for enclosing the drive shaft which extends forwardly of the rear axle to be properly connected to the power plant, which is not shown.

Referring particularly to Figs. 1 and 2, it will be seen that each side bar of the chassis frame extension A has suitably attached thereto a depending bracket 15 which is secured to the frame extension A by means of bolts, rivets, or the like 16. This bracket is shown in vertical section in Fig. 6 and includes an angularly arranged, laterally extending foot portion 17 having parallel bearing enlargements 18 for journaling a transversely extending rock shaft 19. It is to be understood that the brackets 15 are properly positioned in alignment with each other prior to being secured to the side bars of the frame extension A so that the rock shaft 19 may be properly journaled in the dual bearing portions 18 of both of the mounting brackets 15.

Extending longitudinally of each side bar of the frame extension A and arranged outwardly of the frame is a spring assembly 20. To enable the standard rear spring of the original truck assembly to be used in this improved suspension and load equalizing system, the two bottom leaves of each of the rear springs are removed and two new leaves 20a and 20b are substituted. These new leaves are made from heavier stock and are designed to withstand greater loads and strains than the two bottom leaves of the stock springs.

Fig. 6 discloses in detail the connecting mechanism for pivotally connecting the spring assemblies 20 to the opposite ends of the rock shaft 19. Each one of these spring assembly connections includes a bearing casting 21 which is provided with a bearing opening 22 for receiving the end of the shaft 19. Lubricating means 23 are provided for supplying lubricant to the bearing surfaces of the shaft 19, the bearing portions 18 of the mounting bracket 15, and the bearing opening 22 of the casting 21. This casting 21 has secured thereto, as by bolts 24, side plates 25 which engage the opposite side edges of the various spring leaves which constitute the spring assembly 20. These plates 25 have secured to the upper portions of the same, as by bolts 26, a block 27 which is adapted to rest upon the top surface of the top spring leaf. The ends of this block 27 are recessed to receive the U-bolts 28 which extend downwardly to enclose the spring and to have their lower ends pass through apertured ears 29 formed on the bearing casting 21. Nuts 30 are connected to the lower ends of the U-bolts 28 for securely fastening said bolts in place. This assembly very efficiently mounts the mid-portions of the side springs on the ends of the rock shaft 19 for permitting the springs to partake of angular movement with respect to said shaft.

In Figs. 1 to 4 inclusive, there is disclosed the mechanism employed for connecting the forward end of each of the spring assemblies 20 to the driving axle B of the truck. Each one of these assemblies includes a casting 31 which is made in the form of a boot for enclosing a substantial portion of the front half of the spring assembly. This boot or casting is of hollow construction and at its forward end is provided with a transverse bolt 32 employed for connecting the forward end of the bottom leaf spring 20a to the boot. Depending ears 33 are formed on the forward end of the boot for receiving a pivot pin 34 by means of which a link 35 is pivotally connected to the pin. This pivotal connection permits the link 35 to swing about a transverse axis or move longitudinally of the vehicle. A second pin 36 is carried by the link 35 and has its axis extending longitudinally of the spring and the vehicle frame. This second pin 36 pivotally connects to the link 35 a composite bracket structure 37 employed for connection with the drive axle B. The two pins 34 and 36 with their associated elements permit the driving axle B to partake of angular and rocking movement with respect to the boots 31 and the forward ends of the spring assemblies 20 to enable the wheels 38, mounted on the driving axle B, to partake of independent vertical movement.

The inner end of the boot rather closely approaches the central mounting for its respective spring assembly for the purpose of delivering the load to the spring at a point close to the spring mounting, with the result that much heavier loads can be taken care of by the spring assembly. The connection between the boot 31 and the spring is best shown in Figs. 1 to 3 inclusive and 5. The inner end of the boot is enlarged to receive rubber blocks 39 and 40 arranged respectively between the top and bottom surfaces of the spring assembly and the top and bottom walls of the boot. A detachable cover plate 41 is provided for gaining access to the interior of the boot end to facilitate original assembly and subsequent replacement of the rubber blocks. These blocks function to absorb shocks and to deaden noises.

Figs. 2, 3, 5 and 8 disclose a form of filler plate 42 which is of angular or stepped formation for fitting snugly the end portions of several of the spring leaves. This filler plate 42 is provided at one end with a pin 43 adapted to be received within an aperture 44 formed in the end of one of the spring leaves for the purpose of retaining the filler plate against endwise movement within the boot and relative to the spring leaves. This filler plate is interposed between the top rubber block 39 and the top surface of the spring assembly.

A second casting, made in the form of a boot 45, is employed for connecting the rear end of each of the spring assemblies 20 to the auxiliary or dead axle 46 which is located rearwardly of the driving axle B. This rear boot and its associated elements are best shown in Figs. 1, 2 and 7. The boot is provided with a pin 47 for connection with the end of the bottom spring leaf, in the same manner as described in connection with the pin 32 for the front boot 31. The inner end of the boot rather closely approaches the mounting structure for the middle portion of the spring assembly for functioning in the same manner as described in connection with the front boot 31 to deliver the load onto the spring 20 as close as possible to the mounting for the spring to enable greater loads to be carried by the said spring. The connection between the inner end of the boot 45 and the spring is the same as the connection between the forward boot 31 and the spring and includes the top and bottom shock absorbing and sound deadening rubber blocks 39 and 40, the removable cover plate 41, and the filler plate 42 with its connecting pin 43.

The rear end of the boot 45 is provided with a compensator form of connection with the auxiliary or dead axle 46. This connection includes depending side arms 48 and 49, the inner surfaces of which snugly and slidably engage the front and rear surfaces of the squared axle 46. The lower ends of these arms 48 and 49 have mounted therebetween a rubber block 50 which is held in place by a bolt 51. This rubber block functions to absorb shocks and deaden noises occurring in the connection.

In my aforementioned application, Serial No. 657,911, I have provided a roller mounting which rests upon the top surface of the rear axle and is connected by a pin to the rear end portion of the rear boot. This roller mounting provides a form of line contact or connection between the boot and the auxiliary axle. I have modified the roller form of connection in this assembly by employing a bearing shoe 52 which is pivotally connected to the arms 48 and 49 of the compensator structure by a pin 53 and is formed with an extended bearing surface 54 which directly engages the top surface of the squared shaft 46. This bearing shoe 52 provides for a much greater bearing surface connection with the auxiliary axle and assures greater life for this connection over the roller type of structure disclosed in my previously filed application.

This assembly will permit the auxiliary axle 46 to rock with respect to the vehicle frame and the rear ends of the spring mountings, and the axle 46 also will be permitted to partake of longitudinal movement relative to the boots 45 and the rear ends of the springs to facilitate independent rise and fall of the respective pairs of wheels 55 which are suitably mounted on the opposite ends of the auxiliary or dead axle 46. This longitudinal movement of the auxiliary axle relative to the boots 45 is of great advantage in executing a turn with the vehicle. To limit the longitudinal movement of the axle 46 with respect to the boots, a substantially U-shaped strap or stop 56 is connected at 57 to the axle 46, and straddles the rear arm 49 of the compensator structure. Stops or straps may be provided for either or both of the connections between the rear boots 45 and the auxiliary axle 46, as desired. The inner surfaces 58 of the side arms of the straps or stops 56 are curved to accommodate the rocking movements of the axle relative to the compensator structure.

The second form of the invention is shown in Figs. 9 to 12 inclusive and is designed to be used with a standard truck which does not possess a torque tube type of rear axle drive. The standard truck chassis is provided with a frame extension A and with a rear axle B. An ordinary drive shaft C' connects the rear axle with the prime mover, not shown.

Each side bar of the vehicle chassis has secured thereto a mounting bracket 60 formed with a depending bearing arm 61 which has secured thereto a transversely extending pin 62. This pin has formed on its inner end a ball 63. A radius or torque rod 64 is universally, pivotally connected by the socket 65 with the ball 63. The rear end of the radius or torque rod 64 is provided with a ball and socket universal joint connection 66 to a pin 67 carried by an arm 68 of a sleeve 69. The sleeve encircles the housing of the rear axle B as best illustrated in Fig. 12. Fig. 9 discloses the fact that a radius or torque rod 64 is provided for each end portion of the rear axle B. These rods 64 resist torque reactions of the drive axle B in the usual manner.

A spring assembly 70 is provided for each side of the vehicle and is arranged outwardly of the side bars of the frame extension A to extend longitudinally thereof. This spring assembly 70 is the same as the spring assembly 20 of the previously described form of the invention with the exception that the two bottom leaves of the standard spring for the original truck are retained; that is, stronger leaves are not substituted. To strengthen and reinforce the spring assemblies, U-clips 71 are provided. These clips are formed with bottom walls of relatively large area adapted to cover an unusually large portion of the bottom surfaces of the spring assemblies. These clips are provided with substantially triangularly shaped side arms 72 which are connected at their upper ends by bolts 73. These clips are clamped to the spring leaves in the manner best illustrated in Fig. 10.

The central portions of the spring assemblies 70 are secured to the side bars of the chassis frame A by the same structural features disclosed and described in connection with the system disclosed in Figs. 1 to 8 inclusive. This assembly, therefore, will not be described again and the same reference numerals will be applied to the respective elements. The connections between the front and rear ends of the springs and the drive and auxiliary or dead axles are the same as those described in connection with the form shown in Figs. 1 to 8 inclusive with the one exception that the filler plates 42 are not employed. The same reference characters, therefore, will be applied to the various elements in connection with Figs. 9 to 12 inclusive as have been used in connection with the form shown in Figs. 1 to 8 inclusive and a detailed description of these various elements will not be repeated.

The suspension system disclosed in Figs. 9 to 12 inclusive operates in the same manner as the form shown in the previous figures.

In my previously identified application, Serial No. 657,511, I have disclosed a suspension and load equalizing system for motor vehicles which employs auxiliary springs arranged inwardly of the side bars of the chassis and between the rock shaft and the drive and auxiliary shafts. It is to be understood that these auxiliary springs may be used in connection with the two forms of the invention shown in this application, if desired and in accordance with the teachings of my prior application.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a suspension and load equalizing system for motor vehicles, a vehicle frame, a pair of laminated springs pivoted intermediate their ends to the sides of the frame, a pair of parallel wheel axles, means for universally pivotally connecting one of the axles to one end of each of the springs, and means for rockably and slidably connecting the second axle to the remaining ends of the springs, said last mentioned means including a shoe having a bearing surface extended in the direction of the length of said axle interposed between each spring and the axle, and a shock absorbing and sound deadening block connected to each spring and bearing against the axle in opposition to said shoe.

2. In a suspension and load equalizing system for motor vehicles, a vehicle frame, a transverse rock shaft connected to the frame, a laminated spring assembly pivotally connected to each end of the rock shaft, a pair of parallel wheel axles, means for pivotally connecting one end of each spring to one of the axles to permit the axle to partake of angular and rocking movements with respect to the springs, a boot enclosing the remaining end of each of the springs, means for rockably and slidably connecting the said boots to the second axle, said connections including bearing shoes interposed between the boots and the axle and having extended bearing surfaces engaging said axle.

3. In a suspension and load equalizing system for motor vehicles, a vehicle frame, a transverse rock shaft connected to the frame, a laminated spring assembly pivotally connected to each end of the rock shaft, a pair of parallel wheel axles, means for pivotally connecting one end of each spring to one of the axles to permit the axle to partake of angular and rocking movements with respect to the springs, a boot enclosing the remaining end of each of the springs, means for rockably and slidably connecting the said boots to the second axle, said connections including bearing shoes interposed between the boots and the axle and having extended bearing surfaces engaging said axle, and means for limiting longitudinal movement of the last mentioned axle with respect to said boots.

4. In a suspension and load equalizing system for motor vehicles, a longitudinally extending spring, a boot enclosing an end portion of the spring, shock absorbing and sound deadening blocks interposed between the top and bottom surfaces of the lead and the boot, a filler plate interposed between the top surface of the spring and the top block, and means for preventing longitudinal movement of the filler plate relative to the spring.

5. In a suspension and load equalizing system for motor vehicles, a laminated spring assembly, means for pivotally connecting the spring assembly to a vehicle frame, a boot enclosing an end portion of the spring assembly, a transverse axle, and a connection between the boot and the axle for permitting rocking and longitudinal sliding movements between the boot and the axle, said connection including a bearing shoe pivotally connected to the boot and having an extended bearing surface engaging the top of the axle.

6. In a suspension and load equalizing system for motor vehicles, a vehicle frame, a transverse rock shaft connected to the frame, a laminated spring assembly pivotally connected to the rock shaft, a boot engaging an end portion of the spring, shock absorbing and sound deadening blocks interposed between the boot and the top and bottom surfaces of the spring, a filler plate interposed between the top block and the top surface of the spring, a transverse axle, and a connection between the end of the boot and the axle adapted for permitting the axle to partake of rocking and sliding movements with respect to the boot, said connection including a bearing shoe pivoted to the boot and having an extended bearing surface engagement with the axle.

7. In a suspension and load equalizing system for motor vehicles, a vehicle frame, a transverse rock shaft connected to the frame, a laminated spring assembly pivotally connected to the rock shaft, a boot engaging an end portion of the spring, shock absorbing and sound deadening blocks interposed between the boot and the top and bottom surfaces of the spring, a filler plate interposed between the top block and the top surface of the spring, a transverse axle, and a connection between the end of the boot and the axle adapted for permitting the axle to partake of rocking and sliding movements with respect to the boot, said connection including a bearing shoe pivoted to the boot and having an extended bearing surface engagement with the axle, and means for limiting sliding movement of the axle relative to the boot.

8. In a suspension and load equalizing system for motor vehicles, a vehicle frame, a transverse rock shaft connected to the frame, a laminated spring assembly pivotally connected to each end of the rock shaft, a boot enclosing each end portion of each spring, said boots having their inner ends closely approaching the connections between the springs and the rock shafts to deliver the load onto the springs from the boots at points relatively close to the mountings for the springs, and a spring encircling clip arranged between the inner end of each boot, the connection between its respective spring and the rock shaft and a pair of axles pivotally connected to the boots at the opposite ends of the springs.

9. In a suspension and load equalizing system for motor vehicles, a longitudinally extending spring, a transverse wheel axle, and means for rockably and slidably connecting said axle to an end of said spring, said means including a boot enclosing the end of the spring and having depending arms receiving the axle therebetween, and a bearing shoe pivotally connected to the end of the spring and having an extended bearing surface engaging one side of said axle, and a shock absorbing and sound deadening block connected to said arms and bearing against said axle in opposition to said shoe.

10. In a suspension and load equalizing system for motor vehicles, a longitudinally extending spring, a transverse wheel axle, and means for rockably and slidably connecting said axle to an end of said spring, said means including a boot enclosing the end of the spring and having depending arms receiving the axle therebetween, and a bearing shoe connected to the end of the spring and having an extended bearing surface engaging one side of said axle, a shock absorbing and sound deadening block connected to said depending arms and bearing against the axle in opposition to said shoe and means for limiting sliding movement of the axle relative to said arms.

11. In a suspension and load equalizing system for motor vehicles, a longitudinally extending spring, a transverse wheel axle, and means for rockably and slidably connecting said axle to an end of said spring, said means including a pair of parallel arms secured to and depending from said spring, a bearing shoe connected to the arms and having an extended bearing surface engaging said axle, means for limiting sliding movement of the axle relative to said arms, and a shock absorbing and sound deadening block connected to said arms and bearing against the axle in opposition to said shoe.

12. In a suspension and load equalizing system for motor vehicles, a longitudinally extending spring, a transverse wheel axle, and means for rockably and slidably connecting said axle to an end of said spring, said means including a boot encircling an end of the spring and having depending arms receiving the axle therebetween, a bearing shoe connected to the boot and having an extended bearing surface engaging the upper side of said axle, and a shock absorbing and sound deadening block connected to said arms and bearing against the under side of said axle.

13. In a suspension and load equalizing system for motor vehicles, a longitudinally extending spring, a transverse wheel axle, and means for rockably and slidably connecting said axle to an end of said spring, said means including a pair of parallel arms secured to and depending from said spring, a bearing shoe connected to the arms and having an extended bearing surface engaging the upper side of said axle, and a shock absorbing and sound deadening block connected to said arms and bearing against the under side of said axle.

14. In a suspension and load equalizing system for motor vehicles, a longitudinally extending spring, a transverse wheel axle, and means for rockably and slidably connecting said axle to an end of said spring, said means including a boot encircling an end of the spring and having depending arms receiving the axle therebetween, a bearing shoe connected to the boot and having an extended bearing surface engaging the upper side of said axle, a shock absorbing and sound deadening block connected to said arms and bearing against the under side of said axle, and means for limiting sliding movement of the axle relative to said arms.

ADOLPH PASCHAL BUQUOR.